(12) United States Patent
Cho

(10) Patent No.: US 7,590,426 B2
(45) Date of Patent: Sep. 15, 2009

(54) DEVICE AND METHOD FOR SEARCHING DIGITAL BROADCASTING CHANNEL USING POSITION INFORMATION

(75) Inventor: Beom-Soo Cho, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 452 days.

(21) Appl. No.: 11/417,827

(22) Filed: May 4, 2006

(65) Prior Publication Data

US 2007/0054637 A1 Mar. 8, 2007

(30) Foreign Application Priority Data

Aug. 9, 2005 (KR) ...................... 10-2005-0072985

(51) Int. Cl.
*H04W 24/00* (2006.01)
(52) U.S. Cl. .................................. 455/456.1; 455/509
(58) Field of Classification Search ................ 455/90.1, 455/456.1, 456.2, 456.3, 456.5, 456.6, 457, 455/550.1, 509, 514
See application file for complete search history.

(56) References Cited

U.S. PATENT DOCUMENTS

| | | | |
|---|---|---|---|
| 5,406,614 A | | 4/1995 | Hara |
| 6,510,318 B1 * | | 1/2003 | Minagawa ............... 455/435.2 |
| 6,522,875 B1 * | | 2/2003 | Dowling et al. .......... 455/414.3 |
| 6,947,754 B2 | | 9/2005 | Ogasawara |
| 7,177,655 B2 * | | 2/2007 | Lai et al. .................... 455/466 |
| 2004/0198217 A1 * | | 10/2004 | Lee et al. .................. 455/3.01 |
| 2004/0203898 A1 * | | 10/2004 | Bodin et al. ............. 455/456.1 |
| 2005/0041687 A1 * | | 2/2005 | Dowling et al. ............. 370/469 |
| 2005/0085183 A1 * | | 4/2005 | Lee ............................ 455/3.01 |
| 2006/0161957 A1 * | | 7/2006 | Lee et al. ...................... 725/62 |

FOREIGN PATENT DOCUMENTS

| | | |
|---|---|---|
| CN | 1514671 | 7/2004 |
| CN | 1845480 | 10/2006 |
| EP | 1 549 069 | 6/2005 |

OTHER PUBLICATIONS

Digital Video Broadcasting (DVB); Guidelines on Implementation and Usage of Service Information (SI), Jan. 2003.
DVB Implementation Guidelines, Jul. 2005.

* cited by examiner

*Primary Examiner*—Blane J Jackson
(74) *Attorney, Agent, or Firm*—The Farrell Law Firm, LLP

(57) ABSTRACT

Provided is a device and method for searching a digital broadcasting channel using position information of a mobile communication terminal. The device includes a broadcasting information management server for collecting broadcasting information from program servers each positioned in a broadcasting area, and managing the collected broadcasting information; a mobile communication terminal for, upon change of the broadcasting area, receiving the broadcasting information from the broadcasting information management server, updating a database, and receiving digital broadcasting; and a communication channel for requesting and receiving the broadcasting information between the broadcasting information management server and the mobile communication terminal.

8 Claims, 4 Drawing Sheets

| 1 | 2 | 3 | 101 | 102 | 103 |
| 4 | 5 | 6 | 104 | 105 | 106 |
| 7 | 8 | 9 | 107 | 108 | 109 |
| 201 | 202 | 203 | 301 | 302 | 303 |
| 204 | 205 | 206 | 304 | 305 | 306 |
| 207 | 208 | 209 | 307 | 308 | 309 |

DEVICE AND METHOD FOR SEARCHING DIGITAL BROADCASTING CHANNEL USING POSITION INFORMATION

PRIORITY

This application claims priority under 35 U.S.C. § 119 to an application entitled "Device and Method for Searching Digital Broadcasting Channel using Position Information" filed in the Korean Intellectual Property Office on Aug. 9, 2005 and assigned Ser. No. 2005-72985, the contents of which are incorporated herein by reference.

BACKGROUND OF THE INVENTION

1. Field of the Invention

The present invention relates generally to a digital broadcasting system, and in particular, to a device and method for searching a digital broadcasting channel using position information of a mobile communication terminal.

2. Description of the Related Art

Broadcasting signals transmitted by providers of digital broadcasting, for example, terrestrial digital multimedia broadcasting (DMB) based on Eureka-147 system, are transmitted within a frequency band allotted to each broadcasting company. Eureka 147 is a standard of European Digital Audio Broadcasting (DAB). In other words, six terrestrial broadcasters are currently selected for the terrestrial DMB to be executed in Korea, and each broadcasting company is allotted a frequency band of 2 MHz. In order to receive the broadcasting signal transmitted at six frequency bands, a receiver should be tuned to a frequency band of a user's desiring broadcasting company. Therefore, in general, the receiver having one tuner cannot receive a signal of a different frequency band, and cannot also confirm receive sensitivity of a corresponding broadcasting channel.

Since frequency bands allotted to local stations of each broadcasting company are all different from each other, the frequency band allotted to terrestrial DMB of a capital territory is not identically used in a local district, and a different frequency band should be used on an area-by-area basis for the same broadcasting station program. If so, similarly with current FM radio, if the user changes a service area, he/she should search a corresponding frequency band and again execute tuning. This tuning is performed in a manual manner.

It is most convenient for the user to select the same broadcasting program through the same user menu irrespective of his/her position. However, a general receiver having one tuner searches a frequency band by user request, and stores the frequency band therein for use. Therefore, as the user changes in position, the receiver neither considers change of a radio wave reception environment nor change of a broadcasting frequency depending on movement between the service areas. In other words, if any user searches a broadcasting channel in a building under a poor reception environment and stores the search result, for example of two broadcasting channels in the receiver, such channel information will always be maintained so long as the user does not again search the broadcasting channel. In other words, even though the user moves and is in a position capable of receiving another broadcasting channeling addition to the two (2) previous broadcasting channels, so long as he/she does not search a new broadcasting channel, channel information on the new receivable broadcasting channel cannot be provided to the user.

Further, if the user searches the channel and stores a channel list in a broadcasting area, and moves to another broadcasting area where the frequency bands are different, the stored channel list of the former area cannot be received in the latter area even though it is the same broadcasting channel. This is because the frequency bands provided to these areas are different from each other.

SUMMARY OF THE INVENTION

It is, therefore, an object of the present invention to provide a device and method for allowing a user to conveniently search a digital broadcasting channel without service limitation under a wireless environment or a multi-frequency network environment using frequencies different from each other on an area-by-area basis.

To achieve the above and other objects, there is provided a device for searching a channel, the device including a broadcasting information management server for collecting broadcasting information from program servers each positioned in a broadcasting area, and managing the collected broadcasting information; a mobile communication terminal for, upon change of the broadcasting area, receiving the broadcasting information from the broadcasting information management server, updating a database, and receiving digital broadcasting; and a communication channel for requesting and receiving the broadcasting information between the broadcasting information management server and the mobile communication terminal.

In another aspect of the present invention, there is provided a method for searching a digital broadcasting channel in a mobile communication terminal that communicates with a broadcasting information management server for collecting broadcasting information from program servers each positioned in a broadcasting area and managing the collected broadcasting information, has a broadcasting information database, and receives digital broadcasting, the method including if a new base station cell ID is received as a user of the mobile communication terminal moves in the broadcasting areas, accessing a broadcasting information database and executing inquiry about change of the broadcasting area; if it is determined from the inquiry result that the broadcasting area changed, requesting the broadcasting information management server to update the broadcasting information; and downloading the broadcasting information from the broadcasting information management server, and updating the broadcasting information stored in the broadcasting information database.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
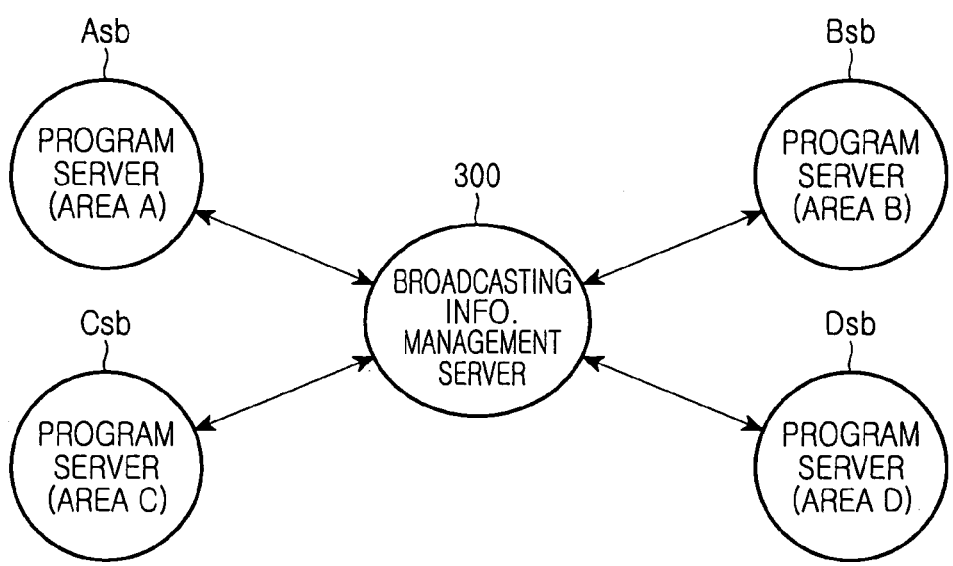
FIG. 1 illustrates a relationship of one broadcasting information management server and a plurality of program servers according to the present invention.

A preferred embodiment of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for conciseness.

FIG. 1 illustrates a relationship of one broadcasting information management server and a plurality of program servers according to the present invention. A construction of the present invention is based on a mobile communication network for providing a wireless telephone service, and a digital broadcasting network (e.g. a terrestrial DMB network).

Each of the program servers (Asb, Bsb, Csb, and Dsb) is positioned at broadcasting areas (A, B, C, and D) different from each other. According to the present invention, an inherent cell ID (identification) list is mapped to each broadcasting area. The program server, a management server of a local broadcasting station, provides information on a construction of its broadcasting program, that is, broadcasting information.

The broadcasting information management server 300 collects and provides broadcasting information of a whole broadcasting area, to a mobile communication terminal (not shown). For this, the broadcasting information management server 300 connects to each of the program server (e.g., Asb, Bsb, Csb, and Dsb) provided at the broadcasting area, and compares frequency information and program information of the broadcasting area with its own information. As the comparison result, if there is changed information, the broadcasting information management server 300 receives and stores the changed information in an internal memory (not shown).

FIG. 2 illustrates a cell ID list on a broadcasting area-by-broadcasting area basis, for detecting change of the broadcasting area according to the present invention.

Figures 2A, 2B:
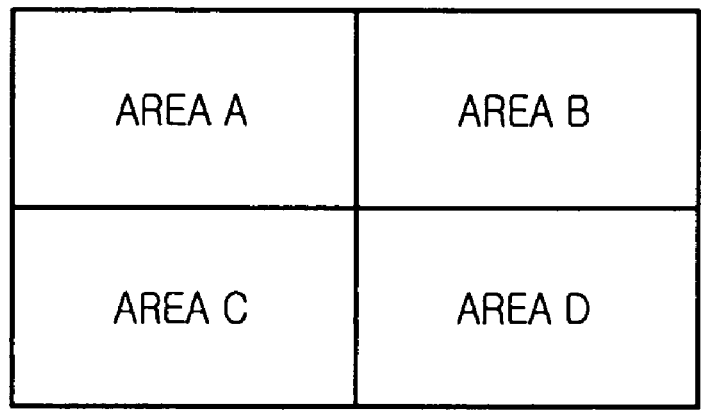
FIG. 2 illustrates a cell ID list on a broadcasting area-by-broadcasting area basis, for detecting change of a broadcasting area according to the present invention.

In an example shown, four broadcasting areas are provided as shown in FIG. 2A, and the cell ID list mapped to each of the broadcasting areas has inherent cell IDs as shown in FIG. 2B.

In case where a user moves from the broadcasting area (A) to the broadcasting area (B), the broadcasting area (A) provides a broadcasting service at a frequency of "12 A" from a broadcasting company "KBS", but the broadcasting area (B) provides a broadcasting service at a frequency of "11 A". Therefore, this information gets to be no longer valid. If the user moves from a cell ID number of "6" to a cell ID number of "104", it is detected that the broadcasting area changes, and frequency and program information of a new broadcasting area are read from a broadcasting information database described later and are provided to the user.

The broadcasting information management server 300, and the mobile communication terminal that can receive digital broadcasting can each detect the change of the broadcasting area. In the broadcasting information database, the frequency information is not often changed, but service program can be often updated. Therefore, the broadcasting information management server 300 updates the broadcasting information in association with the program server of the local broadcasting station, and downloads broadcasting information to the mobile communication terminal whenever the broadcasting area changes.

An example of a construction of the broadcasting information database is shown in Table 1 below.

TABLE 1

| Area information | Broadcasting company | Cell ID list | Frequency | Program information |
|---|---|---|---|---|
| Area A | KBS | 1-100 | 12A | |
| | MBC | | 12B | |
| | SBS | | 12C | |
| Area B | KBS | 101-300 | 11A | |
| | MBC | | 11B | |
| | SBS | | 11C | |
| Area C | KBS | 201-300 | 10A | |
| | MBC | | 10B | |
| | SBS | | 10C | |
| Area D | KBS | 301-400 | 8A | |
| | MBC | | 8B | |
| | SBS | | 8C | |

The area information indicates the broadcasting area in service of terrestrial DMB, and is sorted at each local station in service of the frequency or program information different from each other.

The broadcasting company is base information for allowing the user using a receiver to be in service of the same broadcasting contents regardless of area. According to the present invention, a channel search is performed so that the user can receive service using the same broadcasting station name even though the frequency and program information of the respective broadcasting companies are different from each other depending on his/her position.

As the user moves, the currently stored frequency and program information of the broadcasting station may change. Therefore, the cell ID list is used to confirm that the user enters a broadcasting area of a new local station. In other words, if the user moves from one broadcasting area to another broadcasting area, he/she receives a new base station cell ID and accordingly, can determine that the broadcasting area changes.

The frequency information refers to a frequency value or code number where being in service of program of each broadcasting company. The program information refers to each variety of information on the program being currently in service at a frequency from each broadcasting company. The program information includes label information for indicating the program, and ID information for uniquely identifying each program. The program information also includes information for tuning the program depending on user's selection when the receiver displays a program list for allowing the user to select corresponding program, using the label and ID information.

Figure 3:
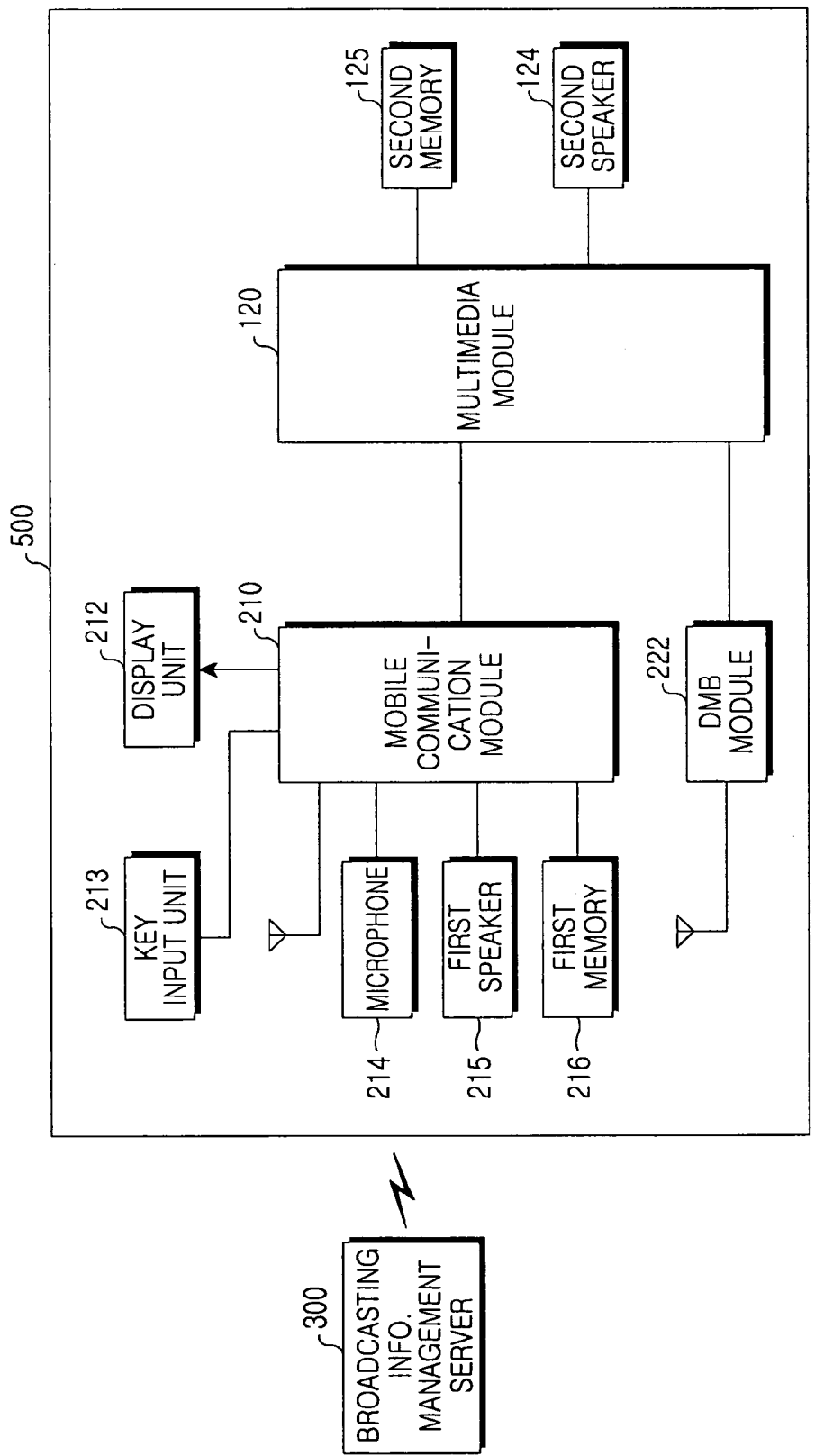
FIG. 3 is a block diagram schematically illustrating a device for searching a digital broadcasting channel according to the present invention.

FIG. 3 is a block diagram schematically illustrating a device for searching a digital broadcasting channel according to the present invention.

The mobile communication terminal 500 according to the present invention, particularly, a wireless telephone combined with a DMB receiver, includes a mobile communication module 210 for controlling a wireless telephone function, a DMB module 222 for controlling a digital broadcasting reception function, and a multimedia module 120 for controlling a multimedia function. The mobile communication module 210 controls a display unit 212, a key input unit 213, a microphone 214, a first speaker 215, and a first memory 216. The multimedia module 120 controls a second speaker 124 and a second memory 125.

An operation of each part will be described in detail below as follows.

The mobile communication module 210 can be embodied by a radio frequency (RF) transceiver part and a modem chip (for example, mobile station modem (MSM) 5500 by QualComm) part. The mobile communication module 210 transceives a call related signal, and controls the general mobile communication functions including the wireless telephone function. The mobile communication module 210 can be connected over a communication channel with the broadcasting information management server 300, to request the broadcasting information management server 300 to update the broadcasting information, and download the broadcasting information from the broadcasting information management server 300.

The display unit 212 displays data on the wireless telephone function and displays the search for the digital broadcasting channel according to the present invention. The display unit 212 also displays received DMB. The key input unit 213 includes a plurality of keys, and is used to input control commands (e.g. playing of the digital broadcasting, and displaying of the broadcasting information) or data (e.g. data on the digital broadcasting channel that the user intends to view, such as a channel number, a program name, or a broadcasting station name) based on a user's manipulation. The key input unit 213 can employ an input interface provided by a corresponding terminal, such as a keyboard, a touch pad, or a voice input.

The microphone 214 receives an audio signal. The first speaker 215 outputs the audio signal (e.g. call voice) related with execution of the wireless telephone function. The first memory 216 stores information related with the general functions of the mobile communication terminal inclusive of the wireless telephone function. Specially, the first memory 216 can have a region for temporarily storing the downloaded broadcasting information. The DMB module 222 includes a receiver for receiving a DMB RF through an antenna, and a demodulator.

The multimedia module 120 transmits the broadcasting information downloaded from the broadcasting information management server 300, to the mobile communication module 210, and plays the digital broadcasting received through the DMB module 222. In other words, the multimedia module 120 decodes DMB data received from the DMB module 222, and outputs and provides multimedia information (video, character, or audio) to the user. The second speaker 124 outputs the audio signal outputted from the multimedia module 120. The second memory 125 can have regions for storing each variety of information related with DMB service provision. According to the present invention, the second memory 125 includes the broadcasting information database for mapping a base station cell ID of a mobile communication network and the frequency and program information in service from each local DMB broadcasting station, that is, the broadcasting information. This broadcasting information is downloaded by the mobile communication module 210 from the broadcasting information management sever 300.

The second speaker 124 is a DMB output interface unit. Although not illustrated, a display unit under control of the multimedia module 120 is further provided and can also display the DMB program therein. The multimedia module 120 can employ an H.264 codec multimedia processor.

As shown, this embodiment is described on the basis of assumption that the mobile communication module 210, the DMB module 222, and the multimedia module 120 are physically separated, but it is also possible to construct all or some of three modules in one chip.

Figure 4:
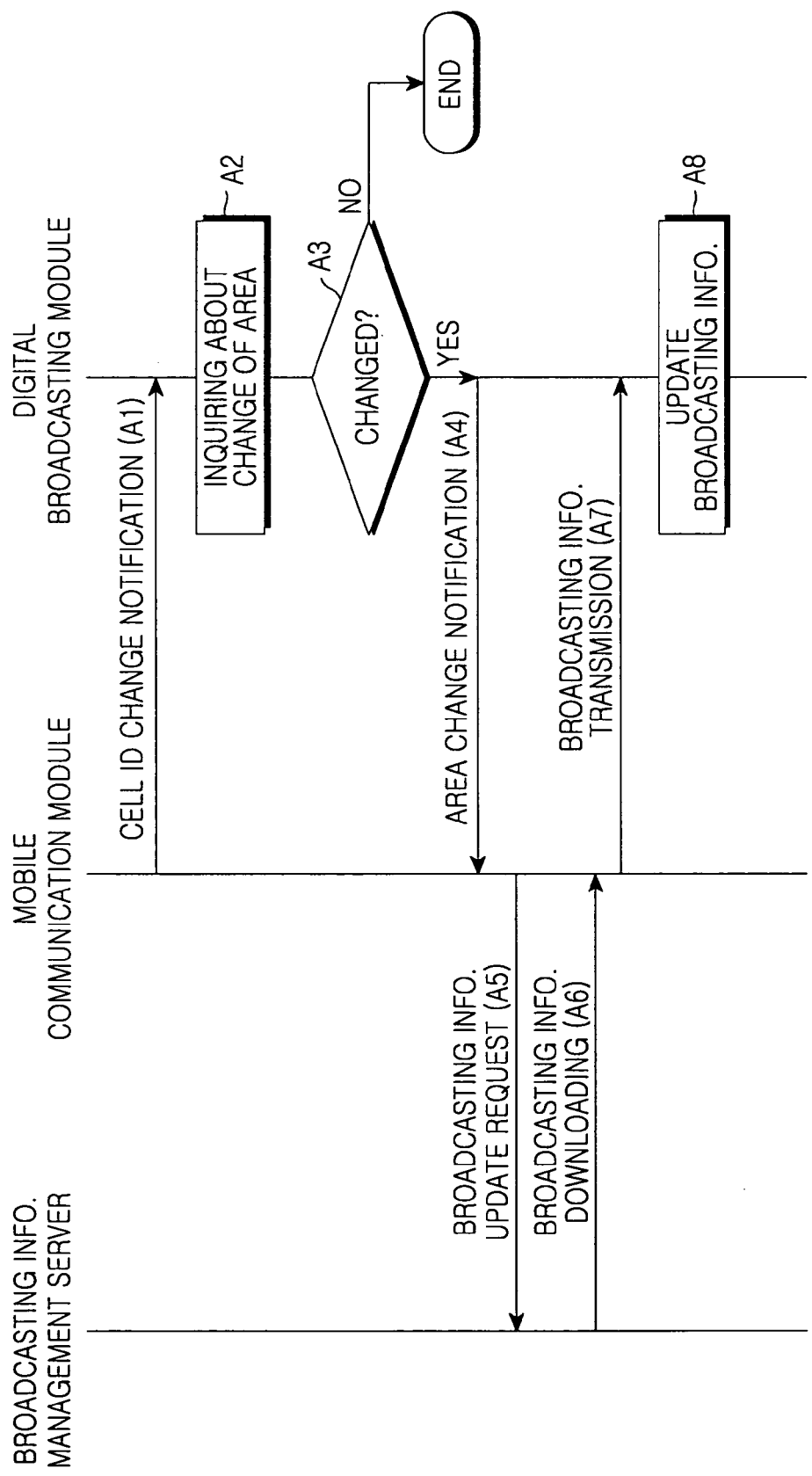
FIG. 4 is a ladder diagram illustrating a method for searching a digital broadcasting channel according to the present invention.

FIG. 4 is a ladder diagram illustrating a method for searching the digital broadcasting channel according to the present invention. In step A1, the mobile communication module 210 of the mobile communication terminal capable of receiving the digital broadcasting notifies the multimedia module 120 of the mobile communication terminal that the cell ID changes. This step is basically a zone based registration used in a conventional mobile communication system. In other words, this step is for a case where, as the user of the mobile communication terminal moves, the base station cell ID in service changes.

In step A2, the multimedia module 120 notified of the change of the cell ID accesses the broadcasting information database of the second memory 125, and executes an inquiry about change of the broadcasting area. If it is determined as the inquiry result that the broadcasting area changes in step A3, in step A4, the mobile communication module 210 is notified that the broadcasting area changes.

In step A5, the mobile communication module 210 notified of the change of the broadcasting area accesses the broadcasting information management server 300 through the mobile communication network. Further, the mobile communication module 210 compares the broadcasting information of the broadcasting area currently stored in the broadcasting information database, with broadcasting information stored in an internal memory of the broadcasting information management server 300. If it is determined as the comparison result that there is no change, the mobile communication module 210 inactivates broadcasting information of a just earlier broadcasting area, and activates broadcasting information of a new broadcasting area stored in the broadcasting information database. If it is determined that there is a change, the mobile communication module 210 requests the broadcasting information management server 300 to update the broadcasting information.

In step A6, when requested to update the broadcasting information, the broadcasting information management server 300 downloads the broadcasting information to the mobile communication module 210.

In step A7, the mobile communication module 210 having obtained the downloaded broadcasting information transmits the broadcasting information to the multimedia module 120.

In step A8, the multimedia module 120, upon receiving the broadcasting information, updates the broadcasting information stored in the broadcasting information database of the second memory 125.

In detail, an operation of the terminal receiving the frequency and program information of the new broadcasting area is mainly divided into two operations. In other words, the operation can be divided into the operations of showing the user the information of the broadcasting area in which the receiver is currently positioned, and updating each program information using information serviceable at a current receiver position when the user initiates the digital broadcasting service (e.g. terrestrial DMB). For this, in the step A5, the mobile communication module 210 notified of entering the new broadcasting area can provide the current broadcasting area information in an icon form. In step A8, the multimedia module 120 updates the broadcasting information stored in the broadcasting information database.

Although not illustrated, a process of changing a user interface of the mobile communication terminal depending on the change of the broadcasting area is set forth as follows. When the new frequency and program information is stored and activated in the mobile communication terminal, if the user is in course of receiving the terrestrial DMB, he/she is informed through the display unit 212 that the earlier stored information changes, and is provided service using the new broadcasting information (e.g. pop-up menu). Further, on a window for displaying status information (e.g. battery, and receive sensitivity) of the mobile communication terminal, the broadcasting area information can also be displayed in an icon form.

As described above, the present invention has an advantage in that the digital broadcasting channel can be searched using the position information, thereby not causing service limitation in a wireless environment or a multi-frequency network environment.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A system for searching a channel, the system comprising:
   a broadcasting information management server for collecting broadcasting information from program servers, and managing the collected broadcasting information, wherein each program server is positioned in a different broadcasting area;
   a mobile communication terminal for, upon reception of a new base station cell ID, accessing a broadcasting information database that maps a cell ID list and broadcasting information and for executing an inquiry about a change in the broadcasting area, and upon change of the broadcasting area, receiving the broadcasting information from the broadcasting information management server, updating the broadcasting information database, and receiving digital broadcasting; and
   a communication channel for requesting and receiving the broadcasting information between the broadcasting information management server and the mobile communication terminal.

2. The system of claim 1, wherein the broadcasting information includes frequency and program information of a broadcasting station.

3. The system of claim 2, wherein the program information includes label information for indicating a program and ID (identification) information for uniquely identifying each program.

4. The system of claim 1, wherein the broadcasting information database further comprises mapping area information for distinguishing the broadcasting area, a broadcasting company, a cell ID list of a mobile communication network base station, frequency information in service of programs of each broadcasting station, and the broadcasting information collected from the program servers.

5. A method for searching a digital broadcasting channel in a mobile communication terminal that communicates with a broadcasting information management server for collecting broadcasting information from program servers each positioned in a different broadcasting area and managing the collected broadcasting information, has a broadcasting information database, and receives digital broadcasting, the method comprising
   if a new base station cell ID is received as a user of the mobile communication terminal moves, accessing the broadcasting information database that maps a cell ID list and broadcasting information, and executing an inquiry about a change of the broadcasting area;
   if it is determined as the inquiry result that the broadcasting area changes, requesting the broadcasting information management server to update the broadcasting information; and
   downloading the broadcasting information from the broadcasting information management server, and updating the broadcasting information database.

6. The method of claim 5, wherein the broadcasting information is frequency and program information of a broadcasting station.

7. A method for searching a digital broadcasting channel in a mobile communication terminal having a mobile communication module and a multimedia module and receiving digital broadcasting, through communication with a broadcasting information management server for collecting broadcasting information from program servers each positioned in a different broadcasting area and managing the collected broadcasting information, the method comprising
   if the mobile communication terminal receives a new base station cell ID, notifying the multimedia module that a cell ID changes;
   if the multimedia module is notified that the cell ID changes, accessing a broadcasting information database that maps a cell ID list and broadcasting information, executing an inquiry about a change of the broadcasting area and, if it is determined that the broadcasting area changes, notifying the mobile communication module that the broadcasting area changes;
   if the mobile communication module is notified that the broadcasting area changes, requesting the broadcasting information management server to update the broadcasting information;
   downloading the broadcasting information from the broadcasting information management server;
   transmitting the downloaded broadcasting information to the multimedia module; and
   receiving the broadcasting information and updating the broadcasting information database in the multimedia module.

8. The method of claim 7, wherein the broadcasting information is frequency and program information of a broadcasting station.

* * * * *

UNITED STATES PATENT AND TRADEMARK OFFICE
CERTIFICATE OF CORRECTION

PATENT NO. : 7,590,426 B2
APPLICATION NO. : 11/417827
DATED : September 15, 2009
INVENTOR(S) : Beom-Soo Cho Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 586 days.

Signed and Sealed this

Twenty-first Day of September, 2010

David J. Kappos
*Director of the United States Patent and Trademark Office*